United States Patent
Grushkevich

(10) Patent No.: US 7,647,023 B2
(45) Date of Patent: Jan. 12, 2010

(54) FREQUENCY SEPARATION FOR MULTIPLE BLUETOOTH DEVICES RESIDING ON A SINGLE PLATFORM

(75) Inventor: Asif Grushkevich, La Jolla, CA (US)

(73) Assignee: Broadcom Corporation, Irvine, CA (US)

( * ) Notice: Subject to any disclaimer, the term of this patent is extended or adjusted under 35 U.S.C. 154(b) by 505 days.

(21) Appl. No.: 11/149,725

(22) Filed: Jun. 10, 2005

(65) Prior Publication Data

US 2006/0281408 A1    Dec. 14, 2006

(51) Int. Cl.
H04B 7/00     (2006.01)

(52) U.S. Cl. .................. 455/41.2; 455/557; 455/501; 455/509; 455/450; 455/515; 455/556.1; 455/452.1; 370/341; 370/437; 370/350

(58) Field of Classification Search ............. 455/41.2, 455/509, 501, 515, 556.1, 556.2, 557, 450, 455/452.1; 370/437, 341, 350, 480, 395.5, 370/201

See application file for complete search history.

(56) References Cited

U.S. PATENT DOCUMENTS

| | | | |
|---|---|---|---|
| 6,480,505 B1 * | 11/2002 | Johansson et al. ............ 370/449 |
| 6,704,346 B1 * | 3/2004 | Mansfield .................. 375/136 |
| 6,717,926 B1 * | 4/2004 | Deboille et al. ............. 370/330 |
| 6,760,317 B1 * | 7/2004 | Honkanen et al. ........... 370/329 |
| 6,823,186 B2 * | 11/2004 | Salokannel et al. ....... 455/452.1 |
| 6,842,460 B1 * | 1/2005 | Olkkonen et al. ........... 370/465 |
| 6,891,857 B1 | 5/2005 | Nevo et al. |
| 6,920,171 B2 * | 7/2005 | Souissi et al. ............... 375/133 |
| 6,941,110 B2 * | 9/2005 | Kloper et al. ............ 455/67.11 |
| 6,965,590 B1 * | 11/2005 | Schmidl et al. ............. 370/343 |
| 6,970,440 B1 * | 11/2005 | Schmidl et al. ............. 370/330 |
| 6,970,905 B2 * | 11/2005 | Jeffery et al. ............... 709/203 |
| 6,975,667 B2 * | 12/2005 | Mattisson et al. ........... 375/132 |
| 6,975,684 B1 * | 12/2005 | Dabak et al. ................ 375/260 |
| 7,016,396 B2 * | 3/2006 | Agrawal et al. ............. 375/135 |
| 7,020,439 B2 * | 3/2006 | Sinivaara et al. ........... 455/41.2 |
| 7,035,235 B2 * | 4/2006 | Jose .......................... 370/330 |
| 7,043,205 B1 * | 5/2006 | Caddes et al. .............. 455/41.2 |
| 7,046,644 B1 * | 5/2006 | Lappetelainen ............. 370/329 |

(Continued)

FOREIGN PATENT DOCUMENTS

EP          1389856 A      2/2004

(Continued)

*Primary Examiner*—Marceau Milord
(74) *Attorney, Agent, or Firm*—McAndrews, Held & Malloy, Ltd.

(57) ABSTRACT

A method for frequency separation for multiple Bluetooth communication devices on a single platform may comprise determining initial frequencies to be utilized by a plurality of Bluetooth communication devices residing on a single host device. A first portion of the determined initial frequencies may be assigned to a first of the plurality of Bluetooth communication devices. At least a second portion of the determined initial frequencies selected from a remaining portion of the determined initial frequencies may be assigned to at least a second of the plurality of Bluetooth devices. Determination may be made based on those determined initial frequencies that have been interfered with by other wireless communication devices. At least a portion of these frequencies that have been interfered with may be eliminated from the determined initial frequencies. The eliminating may be done dynamically and the determined initial frequencies may be re-assigned based on the eliminating.

6 Claims, 9 Drawing Sheets

U.S. PATENT DOCUMENTS

| | | | | |
|---|---|---|---|---|
| 7,050,402 B2* | 5/2006 | Schmidl et al. | | 370/252 |
| 7,058,050 B2* | 6/2006 | Johansson et al. | | 370/386 |
| 7,079,516 B2* | 7/2006 | You et al. | | 370/337 |
| 7,123,877 B2* | 10/2006 | Lin | | 455/41.2 |
| 7,133,396 B1* | 11/2006 | Schmidl et al. | | 370/347 |
| 7,164,704 B1* | 1/2007 | Dabak et al. | | 375/133 |
| 7,180,903 B1* | 2/2007 | Haartsen | | 370/442 |
| 7,193,976 B2* | 3/2007 | Chun | | 370/311 |
| 7,209,470 B2* | 4/2007 | McGowan | | 370/349 |
| 7,216,231 B2* | 5/2007 | Gehrmann | | 713/171 |
| 7,248,570 B2* | 7/2007 | Bahl et al. | | 370/329 |
| 7,257,099 B2* | 8/2007 | Myojo | | 370/329 |
| 7,257,106 B2* | 8/2007 | Chen et al. | | 370/338 |
| 7,260,357 B2* | 8/2007 | Hulvey | | 455/41.2 |
| 7,272,132 B2* | 9/2007 | Kim et al. | | 370/350 |
| 7,366,534 B2* | 4/2008 | Hong | | 455/509 |
| 7,424,268 B2* | 9/2008 | Diener et al. | | 455/62 |
| 7,454,171 B2* | 11/2008 | Palin et al. | | 455/41.2 |
| 7,483,677 B2* | 1/2009 | Zechlin et al. | | 455/73 |
| 2001/0005368 A1* | 6/2001 | Rune | | 370/390 |
| 2002/0021746 A1 | 2/2002 | Schmidl et al. | | |
| 2002/0090004 A1* | 7/2002 | Rinchiuso | | 370/468 |
| 2002/0167961 A1* | 11/2002 | Haartsen | | 370/444 |
| 2004/0156353 A1* | 8/2004 | Bevan et al. | | 370/351 |
| 2004/0203398 A1* | 10/2004 | Durrant | | 455/63.1 |
| 2007/0243892 A1* | 10/2007 | Mikami et al. | | 455/507 |

FOREIGN PATENT DOCUMENTS

| | | |
|---|---|---|
| EP | 1404071 A | 3/2004 |
| WO | WO 02/05448 A | 1/2002 |
| WO | WO 2004-114706 A | 12/2004 |

* cited by examiner

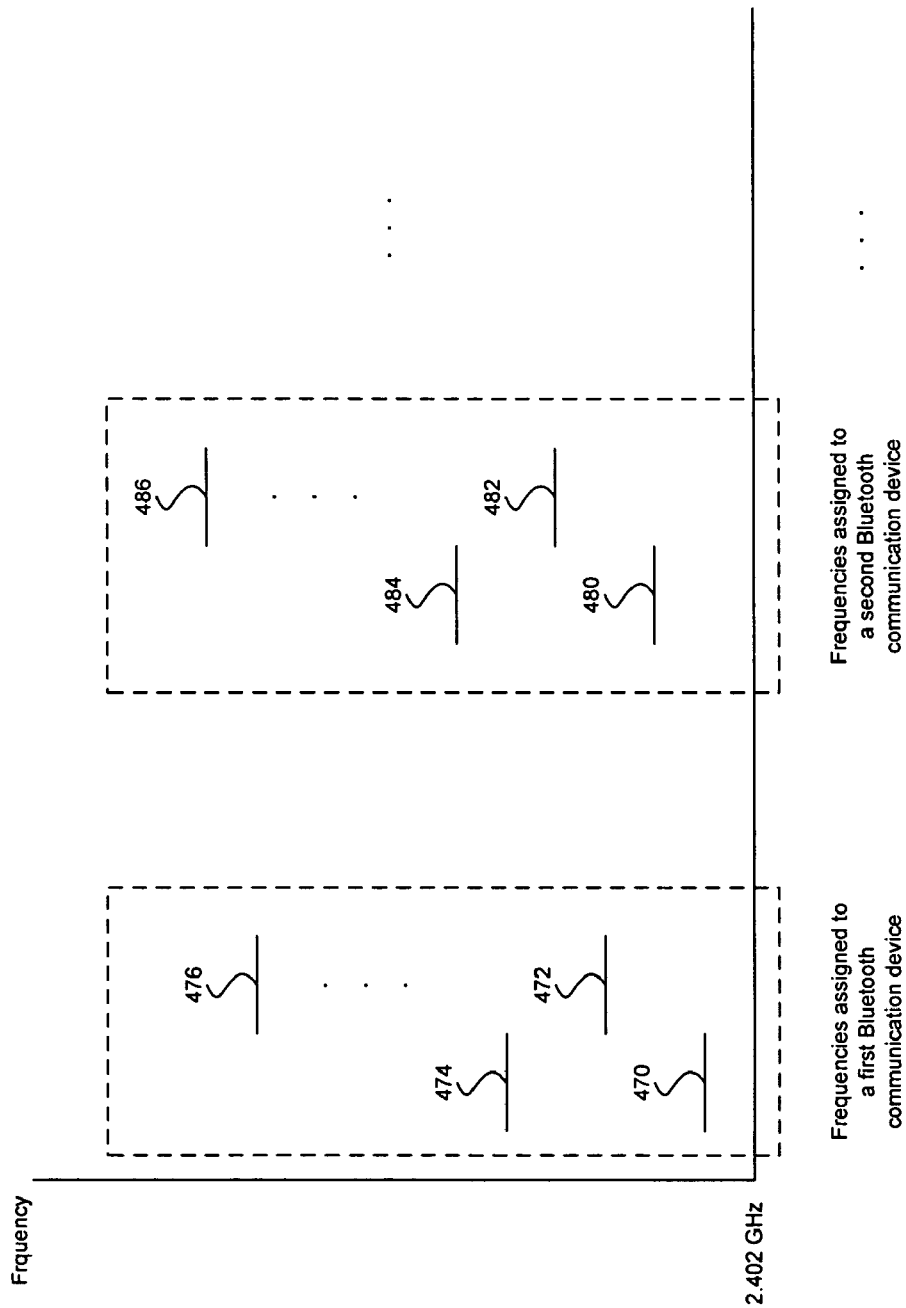

FREQUENCY SEPARATION FOR MULTIPLE BLUETOOTH DEVICES RESIDING ON A SINGLE PLATFORM

CROSS-REFERENCE TO RELATED APPLICATIONS/INCORPORATION BY REFERENCE

Not Applicable.

FIELD OF THE INVENTION

Certain embodiments of the invention relate to wireless communication. More specifically, certain embodiments of the invention relate to frequency separation for multiple Bluetooth devices residing on a single platform.

BACKGROUND OF THE INVENTION

Some conventional communication systems are known to support wireless and wireline communication between wireless and/or wireline communication devices. Such communication systems range from national and/or international cellular telephone systems to the Internet, and to point-to-point in-home wireless networks. Each type of communication system is designed, and hence operates, in accordance with relevant communication standards. For instance, wireless communication systems may operate in accordance with one or more standards including, but not limited to, IEEE 802.11, Bluetooth, advanced mobile phone services (AMPS), digital AMPS, global system for mobile communications (GSM), code division multiple access (CDMA), local multipoint distribution systems (LMDS), multi-channel-multipoint distribution systems (MMDS), and/or variations thereof.

Depending on the type of wireless communication system, a wireless communication device, for example, a cellular telephone, two-way radio, personal digital assistant (PDA), personal computer (PC), laptop computer, or home entertainment equipment, communicates directly or indirectly with other wireless communication devices. For direct communications, also known as point-to-point communications, the participating wireless communication devices tune their receivers and transmitters to the same channel, or channels, and communicate via those channel(s). Each channel may utilize one or more of the plurality of radio frequency (RF) carriers of the wireless communication system. For indirect wireless communication, each wireless communication device communicates directly with an associated base station, for example, for cellular services, and/or an associated access point, for example, for an in-home or in-building wireless network, via an assigned channel or channels.

In order for each wireless communication device to participate in wireless communication session, it utilizes a built-in radio transceiver, which comprises a receiver and a transmitter, or it is coupled to an associated radio transceiver, for example, a station for in-home and/or in-building wireless communication networks, or a RF modem. The transmitter converts data into RF signals by modulating the data in accordance with the particular wireless communication standard. However, different communication systems may use different standards, for example, the IEEE 802.11 standard and the Bluetooth standard, which may share the same RF spectrum.

In order to alleviate signal interference from sharing an RF spectrum with other communication systems, the Bluetooth standard allows frequency hopping where information is transmitted at various frequencies. In this manner, the energy of the transmitted signal is spread across the RF spectrum in 79 channels with each channel separated by 1 MHz, between 2.402 GHz and 2.480 GHz. The Bluetooth standard allows 1600 frequency hops per second. The advantage of the frequency hopping system is that it spreads information across a wide band of frequencies. Therefore, signals transmitted by other systems using a portion of the same frequency spectrum may appear to be noise to only some of the frequencies used by Bluetooth in frequency hopping. Similarly, only a portion of Bluetooth transmission may interfere with signals transmitted by other systems.

Two or more Bluetooth devices, up to a total of eight devices, may comprise a piconet with one master device and up to seven slave devices. The piconet may share a common communication data channel that presently may have a total capacity of 1 megabits per second (Mbps), up to a theoretical maximum of 3 Mbps. This data channel is divided in to time slots of 625 microseconds. Although a master device may initiate contact with any slave device, a slave device may only respond to a master device. A piconet link between a master device and a slave device may be either synchronous connectionless oriented (SCO) or asynchronous connectionless (ACL). The piconet may support up to three SCO links, and any remaining bandwidth may be utilized by ACL links.

At the present time, a host device, or a host platform, for example, a personal computer (PC), may use the Bluetooth standard for a wireless keyboard and a wireless mouse applications. A single Bluetooth communication device on the PC may transmit and receive signals related to the wireless keyboard and the wireless mouse. However, as Bluetooth becomes more ubiquitous, many other Bluetooth applications, such as voice communication, and/or audio and/or video data transfer, may be added to the PC. The Bluetooth applications on the PC may then be bandwidth limited. Therefore, the PC may require more than one Bluetooth communication device in order to accommodate the additional devices that wish to communicate via the Bluetooth standard. This may lead to additional interference among the different Bluetooth communication devices that may be transmitting at the same time.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method for frequency separation for multiple Bluetooth devices residing on a single platform, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

BRIEF DESCRIPTION OF SEVERAL VIEWS OF THE DRAWINGS

FIG. 4c is a diagram illustrating frequencies assigned to two Bluetooth communication devices, in accordance with an embodiment of the invention.

DETAILED DESCRIPTION OF THE INVENTION

Certain embodiments of the invention may be found in a method and system for frequency separation for multiple Bluetooth communication devices residing on a single platform, or host device. Various aspects of the invention may provide support for a plurality of Bluetooth devices that reside on a single host device to transmit signals while reducing signal interference among the transmitted signals. Aspects of the invention may comprise determining initial frequencies to be utilized by a plurality of Bluetooth communication devices residing on a single host device. A first portion of the determined initial frequencies may be assigned to a first of the plurality of Bluetooth communication devices. At least a second portion of the determined initial frequencies selected from a remaining portion of the determined initial frequencies may be assigned to at least a second of the plurality of Bluetooth devices.

It may be determined whether the determined initial frequencies are experiencing interference, or have been interfered with, by other wireless communication devices. The interference on the determined initial frequencies may be dynamically determined. At least a portion of the determined initial frequencies that is experiencing interference, or has been interfered with, may be eliminated from the determined initial frequencies. The eliminating of the initial frequencies may be done dynamically and the determined initial frequencies re-assigned based on the eliminating.

Figure 1:
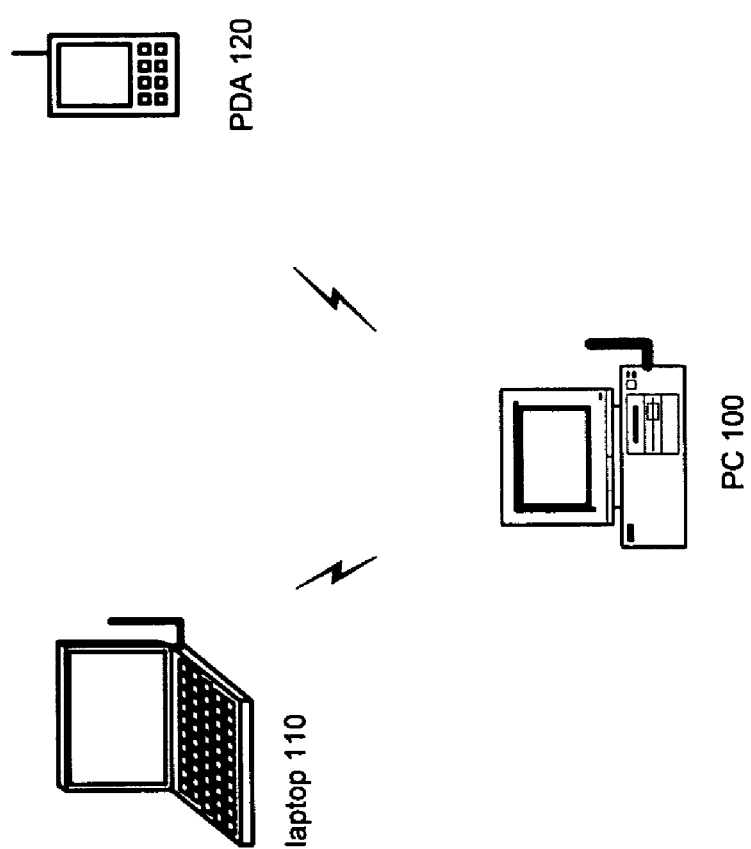
FIG. 1 illustrates a Bluetooth piconet that may be utilized in connection with an embodiment of the invention.

FIG. 1 illustrates a Bluetooth piconet that may be utilized in connection with an embodiment of the invention. Referring to FIG. 1, there is shown a personal computer (PC) 100, a laptop 110, and a personal digital assistant (PDA) 120. These three host devices, or host platforms, may each be Bluetooth enabled. Each host device may have a Bluetooth application and a Bluetooth communication device for transmitting and receiving signals. Each host device may then be considered to be a Bluetooth device. Up to eight Bluetooth devices may communicate with each other in a local network called a piconet. In a given piconet, only one Bluetooth device may be a master, while the others may be slaves.

The process for designating a master may be a dynamic process each time a piconet is set up. A Bluetooth device may be a member of multiple piconets, where it may be designated as a master device for one piconet, and a slave device for another piconet. Each Bluetooth device may use an algorithm that takes into account different variables, for example, performance and power requirements, in deciding whether it may want to be a master device. For example, since transmitting signals to locate other Bluetooth devices to form a piconet may take power and transmission bandwidth, a Bluetooth device may wait passively for other Bluetooth devices to try to establish a piconet. A Bluetooth device that finds other Bluetooth devices, and establishes a connection with one or more Bluetooth devices, may be designated as the master Bluetooth device for that piconet. Multiple piconets that may have connection with each other, for example, where a Bluetooth device may be a member of more than one piconet, may be referred to as a scatternet.

Although only a single piconet is illustrated, in a system comprising a plurality of piconets, it may be possible for a Bluetooth device to operate as a master device in one piconet and as a slave device in an adjacent piconet. For example, a Bluetooth device A may operate as a master device in a first piconet $P_1$ and as a slave device in a second piconet $P_2$. In another example, the Bluetooth device A may operate as a slave device in a first piconet $P_1$ and as a master device in a second piconet $P_2$. A master device, for example, the PC 100, may communicate with each of the slave devices, for example, the laptop 110 and the PDA 120. However, the slave devices may not communicate directly with each other. When the master device moves out of range of communication, the piconet may be destroyed until another Bluetooth device establishes a piconet.

Figure 2:
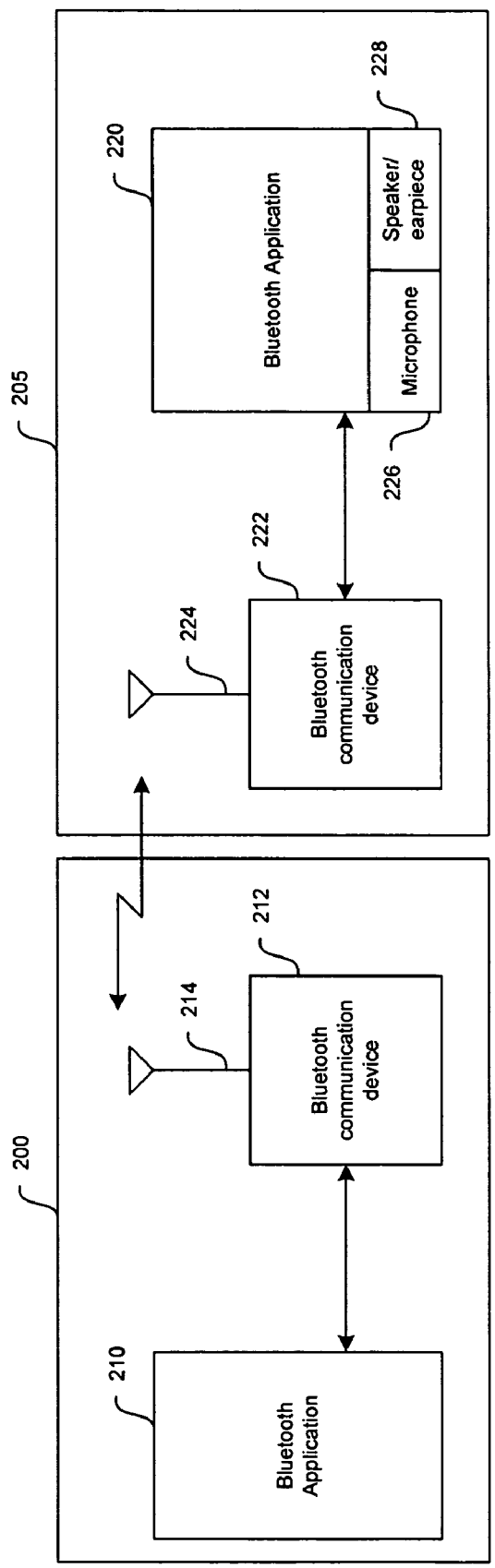
FIG. 2 is a block diagram illustrating host devices that may be utilized in connection with an embodiment of the invention.

FIG. 2 is a block diagram illustrating host devices that may be utilized in connection with an embodiment of the invention. Referring to FIG. 2, there is shown host devices 200 and 205. The host device 200 may comprise a Bluetooth application 210, a Bluetooth communication device 212, and an antenna 214. The host device 205 may comprise a Bluetooth application 220, a Bluetooth communication device 222, and an antenna 224. The host devices 200 and 205 may be, for example, a cellular phone and a cellular hands-free accessory, respectively, that may allow a cellular phone user to carry on a conversation without having to hold the cellular phone. In this respect, the host device 205 may further comprise a microphone 226 and a speaker/earpiece 228. The Bluetooth communication devices 212 and 222 may comprise suitable logic, circuitry and/or code that may be adapted to communicate data, command and/or status with the Bluetooth applications 210 and 220 on the host devices 200 and/or 205, respectively. The Bluetooth communication devices 212 and 222 may also be adapted to communicate data, via antennas 214 and 224, respectively, with other Bluetooth devices.

In operation, a user of the host device 200, which may be a cellular phone enabled for Bluetooth, for example, may wish to utilize a Bluetooth enabled hands-free kit, which may be the host device 205, for example. The hands-free kit and the cellular phone, when turned on, may communicate with each other to establish a piconet. The cellular phone, which may be the host device 200, may be the master device and the hands-free kit, which may be the host device 205, may be the slave device. As a slave device, the host device 205 may only respond to requests from the master device, for example, the host device 200. In the description below, any transmission from the slave device, for example, the host device 205, may be assumed to be in response to a request from the master device, for example, the host device 200.

The cellular phone user may initiate a call on the cellular phone, for example, the host device 200. The audio signal at the cellular phone may be communicated to the Bluetooth communication device 212. The Bluetooth communication device 212 may modulate the audio signal to RF signal as required by the Bluetooth standard, and may transmit the RF signal via the antenna 214. The Bluetooth communication device 222 may receive the RF signal via the antenna 224, and demodulate the RF signal to a baseband signal. The baseband signal may be communicated to the Bluetooth application 220, which may communicate audio signals to the speaker/earpiece 228 such that the hands-free kit user may hear the ringing, messages, and/or the called party's portion of the conversation.

In a similar fashion, when the cellular phone user speaks into the microphone 226, the audio signal may be communicated to the Bluetooth communication device 222, where the audio signal may be modulated to RF signal, which may be transmitted via the antenna 224. The Bluetooth communication device 212 may receive the RF signal via the antenna 214 and may demodulate the RF signal to a baseband signal. The baseband signal may be communicated to the cellular phone, the host device 200, which may communicate the baseband signal to the called party via a cellular communication channel.

Figure 3A:
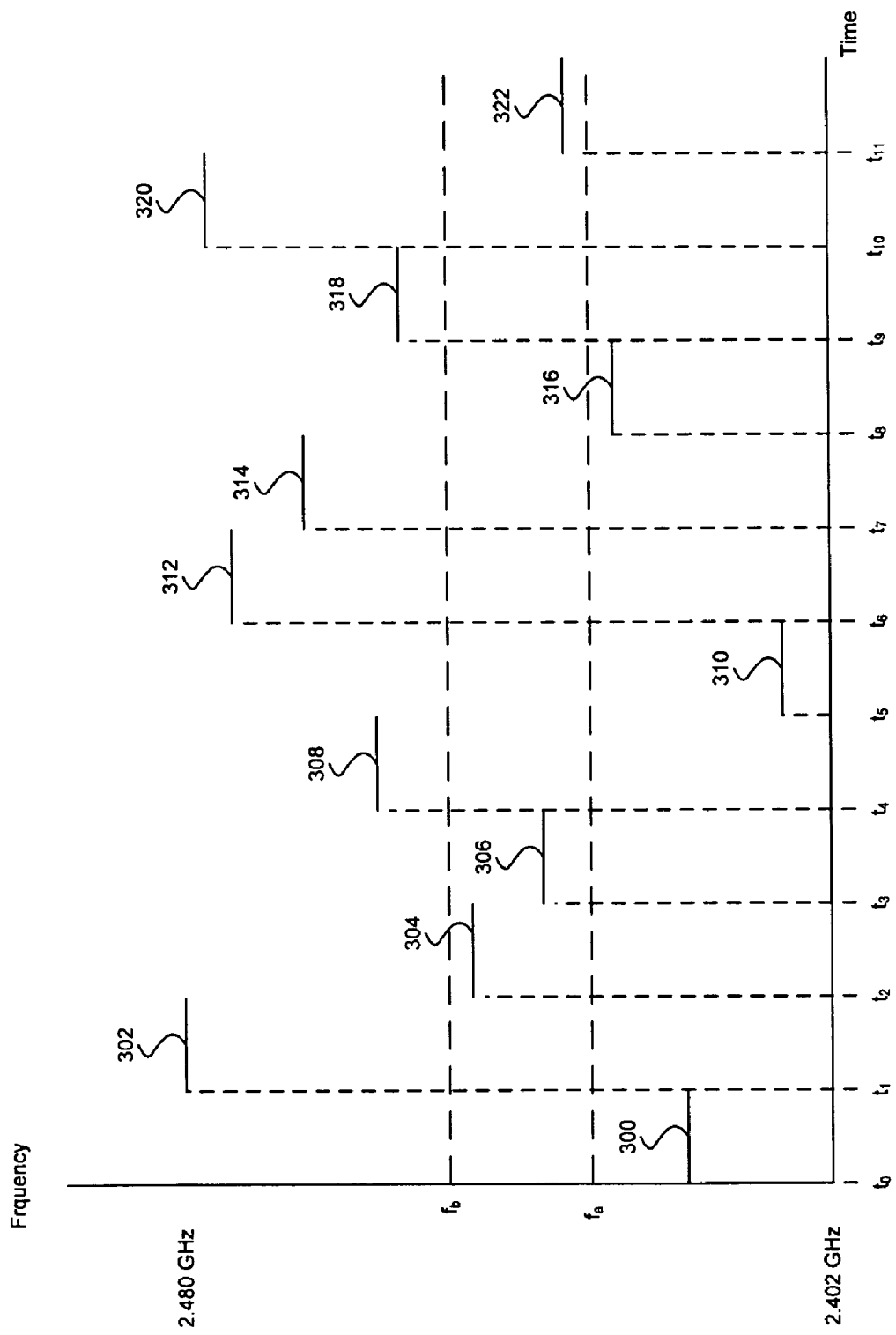
FIG. 3a is a diagram illustrating frequency hopping, in connection with an embodiment of the invention.

FIG. 3a is a graph illustrating frequency hopping, in connection with an embodiment of the invention. Referring to FIG. 3a, there is shown a graph with frequency on the vertical axis and time on the horizontal axis. There is also shown a frequency range of frequencies from 2.402 gigahertz (GHz) to 2.480 GHz, and a subset of this frequency range with frequencies from $f_a$ to $f_b$. There is also shown a plurality of Bluetooth packets 300, 302, . . . , 322, transmitted at times $t_0$, $t_1$, . . . , $t_{11}$. The frequency range from 2.402 GHz to 2.480 GHz may be the spectrum utilized by Bluetooth communication devices. The frequency range from $f_a$ to $f_b$ may be the spectrum utilized by, for example, a wireless local area network (WLAN) utilizing the IEEE 802.11 standard.

In operation, the Bluetooth device, for example, the host device 200 (FIG. 2), may transmit packets where each packet may be transmitted at a different frequency. This may be referred to as frequency hopping. The advantage of frequency hopping may be that the information transmitted may be spread over a wide spectrum of frequencies, and therefore, noise at any part of the spectrum may only affect a portion of the information transmitted. The noise may be any signal in the transmit frequency range that affects the transmitted information. For example, if WLAN devices are transmitting in the frequency range $f_a$ to $f_b$, a receiving Bluetooth device may determine that packets 304, 306 and 322 may be corrupted. The receiving Bluetooth device may request retransmission of these packets.

Figure 3B:
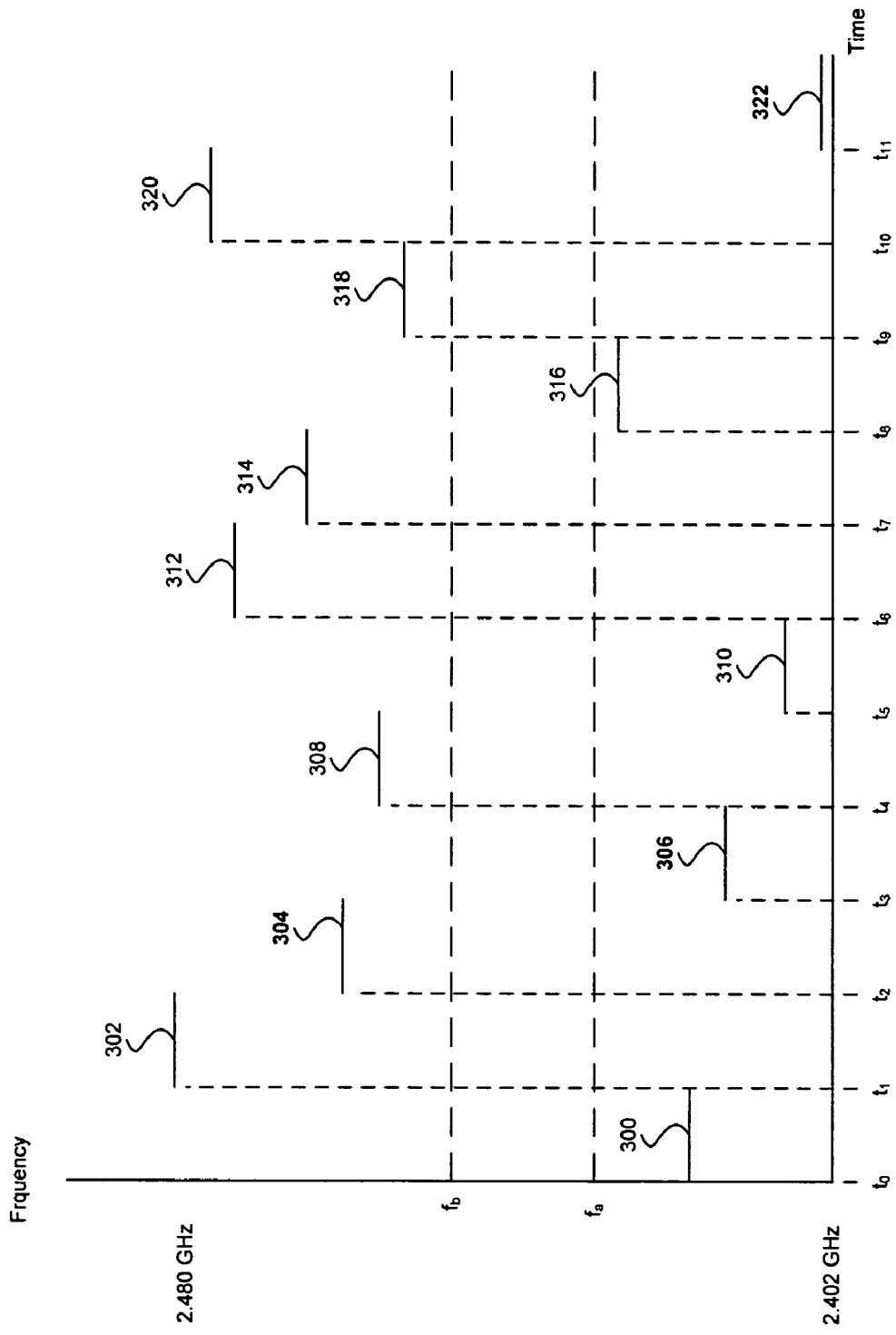
FIG. 3b is a graph illustrating adaptive frequency hopping, in connection with an embodiment of the invention.

FIG. 3b is a graph illustrating adaptive frequency hopping, in connection with an embodiment of the invention. Referring to FIG. 3b, there is shown a graph similar to the graph referred to in FIG. 3a. However, in this graph, an implementation of adaptive frequency hopping may determine the frequencies at which the corrupted packets, for example, the packets 304, 306 and 322 with respect to FIG. 3a, may have been transmitted. The Bluetooth devices may then determine that there is interference at these frequencies, and may block out these frequencies by mapping these frequencies to different frequencies. Accordingly, the packets 304, 306 and 322 may be transmitted at different frequencies.

However, the adaptive frequency hopping algorithm may map a transmission frequency to another frequency that may also interfere with another communication device. For example, the reassigned frequency may still be within the spectrum of frequencies from $f_a$ to $f_b$. The Bluetooth devices may determine that this frequency also has interference and may block it out. In this manner, frequencies that are known to interfere may be blocked out such that transmission of information may be efficient.

Figure 4A:
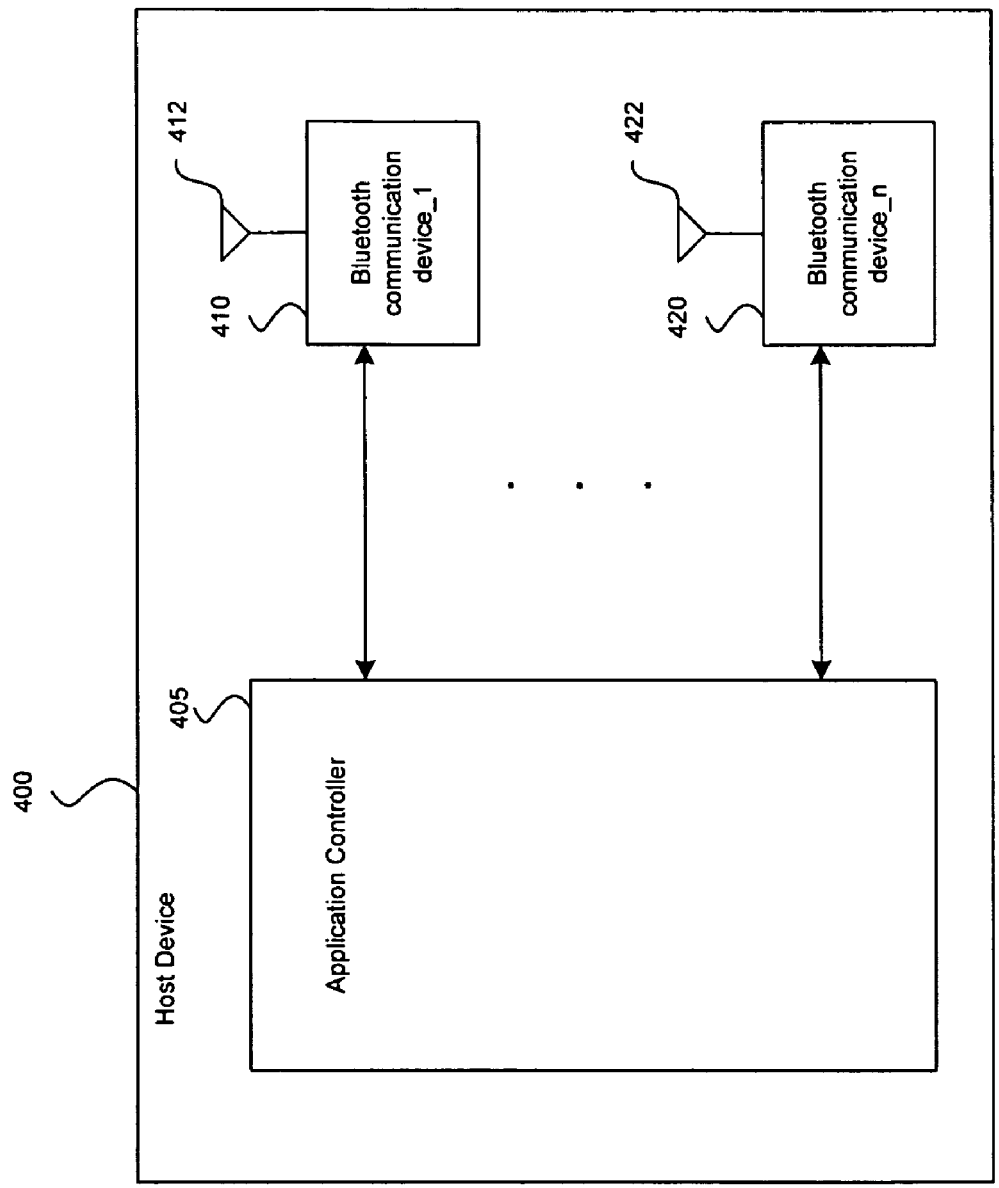
FIG. 4a is a block diagram illustrating a host device with multiple Bluetooth communication devices, in accordance with an embodiment of the invention.

FIG. 4a is a block diagram illustrating a host with multiple Bluetooth communication devices, in accordance with an embodiment of the invention. Referring to FIG. 4a, there is shown a host device 400, an application controller 405, Bluetooth communication device_1 410, . . . Bluetooth communication device_n 420, and a plurality of antennas 412 . . . 422.

The host device 400 may be similar to the host device 210 (FIG. 2) or the host device 220 (FIG. 2) in that it communicates with a Bluetooth communication device. However, the host device 400 may communicate with one or more Bluetooth communication devices, for example, the Bluetooth communication device_1 410, . . . , and Bluetooth communication device_n 420. The application controller 405 may comprise suitable circuitry, logic, and/or code that may be adapted to control and/or communicate to a plurality of Bluetooth applications and/or Bluetooth communication devices on the host device 400.

The host device 400 may have more than one Bluetooth communication device for a few reasons. A first reason may be that if the bandwidth provided by a Bluetooth communication device is insufficient, another Bluetooth communication device may be added for additional bandwidth. For example, a user may be downloading a streaming video file, downloading music files, and talking on a voice over IP (VoIP) connection. The user may find that downloading the video file and the audio file is interfering with his VoIP connection. Accordingly, it may be useful to be able to offload downloading of the video file to another piconet where it may be downloaded in its own dedicated piconet. The downloading of the audio files and the VoIP conversation may be on a separate piconet and, therefore, may not be adversely affected by the video download.

A second reason may be if the user has more than seven Bluetooth applications, and the user wants to run all the applications at once. For example, the user may be using a PC with a wireless mouse, a wireless keyboard, a connection to a PDA, a connection to a laptop, a connection to a printer, a connection to a scanner, music being downloaded from a Bluetooth enabled CD player, and a synchronizing application between the PC and a cell phone to download messages and/or update a phonebook. Because a piconet may only handle eight devices, one master and seven slaves, if the Bluetooth communication device on the PC is the only master, the Bluetooth communication device would not be able to handle all the desired applications. Therefore, it may be necessary to have another Bluetooth communication device to handle some of the applications.

However, if a host device has more than one Bluetooth communication device, the Bluetooth communication devices may interfere with each other's transmitted signals if the transmit frequencies overlap. Accordingly, the application controller 405, which may be an application layer program, for example, may determine how many Bluetooth applications may be on the host device, and then determine how those applications may be allocated to specific Bluetooth communication devices. The algorithm for allocating applications to Bluetooth devices may be design and/or implementation dependent. An algorithm may take into account, for example, the expected bandwidth required by the Bluetooth application, the expected maximum burst rate of data for the Bluetooth application, and the expected average data rate for the Bluetooth application. The application may have associated with it an identifying code, or identifier. Allocation may further be dependent on the frequencies available for the Bluetooth communication devices, and/or bandwidth available to each of the Bluetooth communication devices.

The application controller 405 may further determine, via an algorithm that may be design or implementation dependent, the frequencies available to each Bluetooth communication device. For example, if there are two Bluetooth communication devices, odd frequencies may be assigned to one of the two Bluetooth communication devices and even frequencies to the other of the two Bluetooth communication devices. Or, for example, if some frequencies are not to be used because of known interferences with other communication systems, for example, a local area network (LAN) using the IEEE 802.11 standard, the remaining frequencies that may be used may be assigned in an alternating manner to the two Bluetooth communication devices. The frequencies assigned may be communicated to the Bluetooth communication devices so that they may be utilized by the Bluetooth communication devices for transmitting and receiving.

The application controller 405 may further determine which frequencies may be available for Bluetooth transmission, that is, which frequencies do not have known interferences with other communication devices. The application controller may then reassign the frequencies that may not interfere with the Bluetooth communication devices. Additionally, the application controller 405 may reallocate the Bluetooth applications to the Bluetooth communication devices. An algorithm for reallocation, which may be similar to the algorithm for allocation, may take into account, for example, the bandwidth required by the Bluetooth application, the maximum burst rate of data for the Bluetooth application, and the average data rate for the Bluetooth application. Reallocation may also be dependent on the frequencies available for the Bluetooth communication devices and/or bandwidth available to each of the Bluetooth communication devices.

Figure 4B:
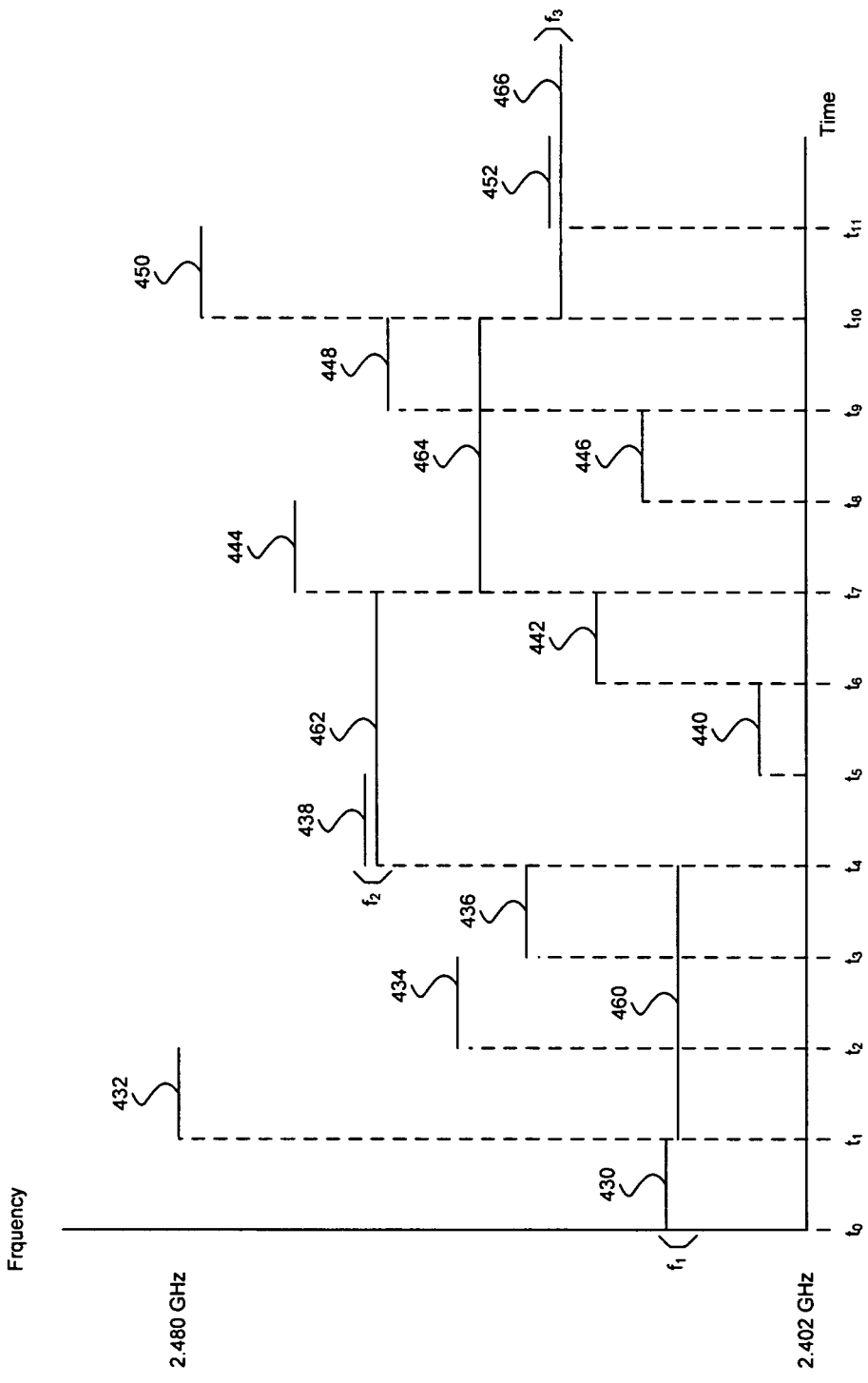
FIG. 4b is a graph illustrating frequencies transmitted by two Bluetooth communication devices, in connection with an embodiment of the invention.

FIG. 4b is a graph illustrating frequencies transmitted by two Bluetooth communication devices, in connection with an embodiment of the invention. Referring to FIG. 4b, there is shown a frequency of 2.402 gigahertz (GHz) that is the lower limit of the Bluetooth frequency spectrum, and a frequency 2.480 GHz that is the upper limit of the Bluetooth frequency spectrum. There is also shown a plurality of transmissions labeled 430 . . . 452 and a plurality of transmissions labeled 460, 462, 464, and 466 that may indicate a portion of the Bluetooth transmissions by a first Bluetooth communication device and a second Bluetooth communication device, respectively. Each of the transmissions 430 . . . 466 may have associated with it a frequency and time of transmission.

Although the implementation of frequency hopping by the Bluetooth communication devices may generally allow communication without interference, there may be instances when Bluetooth communication devices may interfere with each other. Interference may be exacerbated by a plurality of Bluetooth communication devices within a very small geographic area, or when one or more Bluetooth communication device utilizes multi-slot transmission. For example, the PC 100 (FIG. 1) may be transmitting songs to the PDA 120 (FIG. 1) using five time slots per frequency, and the PDA 120 may be playing the song at real time.

The first Bluetooth communication device may transmit at each of time instances $t_0 \ldots t_{11}$. The second Bluetooth communication device may transmit at time instances $t_1, t_4, t_7,$ and $t_{10}$. The transmissions 430 and 460 at time instances $t_0$ and $t_1$, respectively, may be at the same frequency $f_1$, but the transmissions may occur at different times. Therefore, there may not be any interference between the transmissions 430 and 460. The transmission 460 at time instance $t_1$ by the second Bluetooth communication device may occur at the same time as transmissions 432, 434 and 436 at time instances $t_1, t_2,$ and $t_3$ by the first Bluetooth communication device, however, there may be no interference because the frequencies may not be the same. However, transmission 438 by the first Bluetooth communication device at time instance $t_4$ may interfere with the transmission 462 at time instance $t_4$ by the second Bluetooth communication device since both transmissions may use the same frequency $f_2$. Similarly, there may be interference between transmission 452 by the first Bluetooth communication device at time instance $t_{11}$ and the transmission 466 at time instance $t_{11}$ by the second Bluetooth communication device because they may use the same frequency $f_3$.

This figure is described with both Bluetooth communication devices synchronized with respect to transmitting times for illustrative purposes. Offsetting the transmission times of one device with respect to the other device will still provide examples where the two devices may interfere with each other.

FIG. 4c is a graph illustrating frequencies assigned to two Bluetooth communication devices, in accordance with an embodiment of the invention. Referring to FIG. 4c, there is shown frequencies 470 . . . 486 that may be assigned to a plurality of Bluetooth communication devices residing on a single host device. For example, the Bluetooth communication device_1 410 (FIG. 4a) may be assigned frequencies 470 . . . 476 that may be different from the frequencies 480 . . . 486 assigned to the Bluetooth communication device_n 420 (FIG. 4a). Accordingly, the transmission by the Bluetooth communication device_1 410 may not interfere with the transmission by the Bluetooth communication device_n 420 since the two devices may not transmit at the same frequency, even if they do transmit at the same time. Similarly, other Bluetooth communication devices on the host device 400 (FIG. 4a) may be assigned their own distinct set of frequencies.

An algorithm for the frequency assignment may be design and/or implementation dependent. For example, an algorithm implementation may comprise assigning each of a plurality of bands of contiguous frequencies to each of a plurality of Bluetooth communication devices. Another algorithm implementation may randomly select frequencies in the Bluetooth frequency range and assign those frequencies to each of a plurality of Bluetooth communication devices. Another algorithm implementation may select specific frequencies, which may not be contiguous, for each of the plurality of Bluetooth communication devices.

As an example, an algorithm for assigning frequencies to two Bluetooth communication devices on the same host device, for example, the Bluetooth communication device_1 410 and Bluetooth communication device_n 420 on the host device 400, may comprise assigning even frequencies to the Bluetooth communication device_1 410 and odd frequencies to the Bluetooth communication device_n 420. Accordingly, the frequencies 470 . . . 476 may comprise the even frequencies that may be assigned to, for example, the Bluetooth communication device_1 410. Similarly, the frequencies 480 . . . 486 may comprise the odd frequencies that may be assigned to, for example, the Bluetooth communication device_n 420. In this manner, the two Bluetooth devices may not interfere with each other while frequency hopping.

Figure 5:
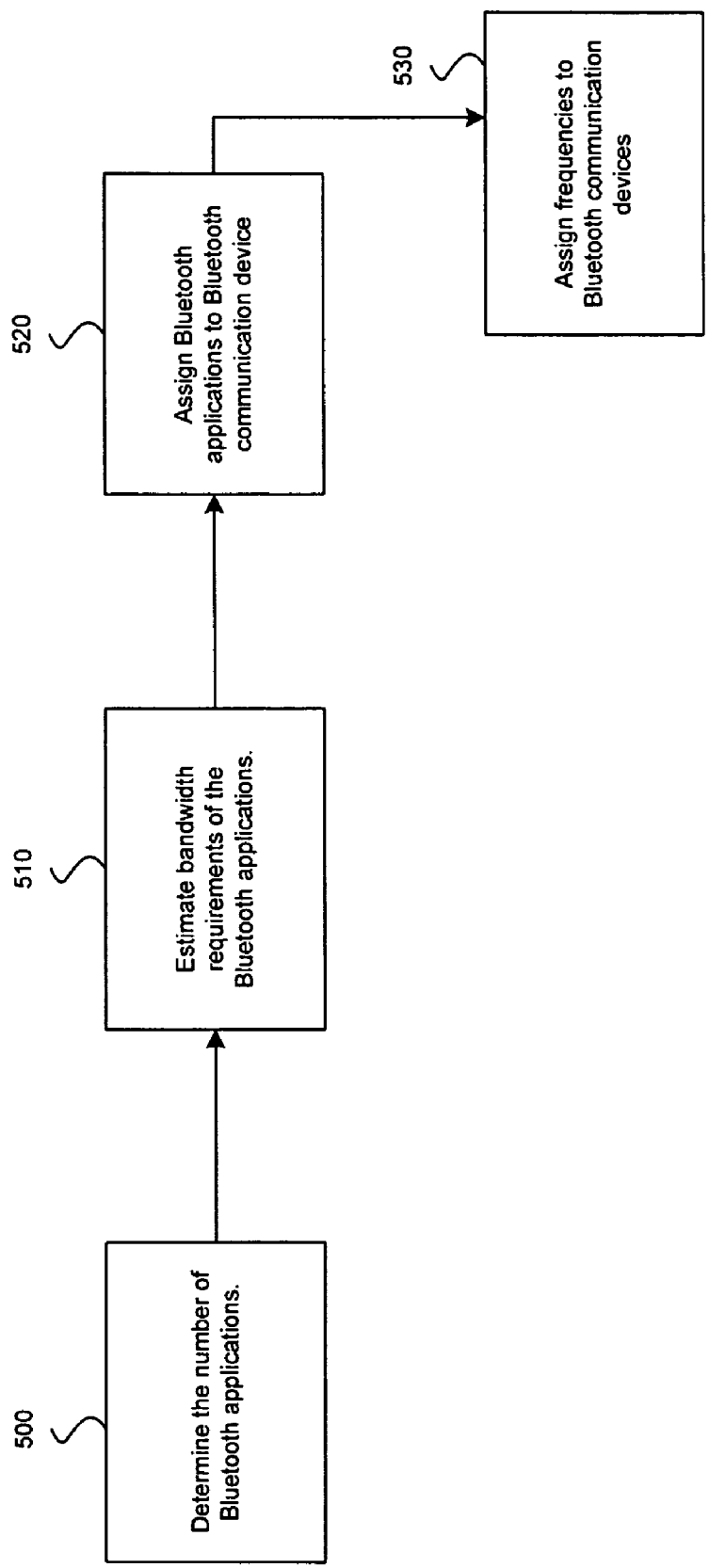
FIG. 5 is an exemplary flow diagram illustrating frequency separation for multiple Bluetooth communication devices on a single host device, in accordance with an embodiment of the invention.

FIG. 5 is an exemplary flow diagram illustrating frequency separation for multiple Bluetooth communication devices on a single host device, in accordance with an embodiment of the invention. Referring to FIG. 5, step 500 comprises determining the number of Bluetooth enabled applications on a host device. Step 510 comprises estimating bandwidth requirements for the Bluetooth enabled applications on the host device. Step 520 comprises allocating Bluetooth enabled applications to Bluetooth communication devices. Step 530 comprises assigning frequencies to each Bluetooth communication device for adaptive frequency hopping.

Referring to FIGS. 1, 4a, and 5, the steps 500 to 530 may be utilized to assign frequencies to a plurality of Bluetooth communication devices, for example, the Bluetooth communication device_1 410 and the Bluetooth communication device_n 420, for use in adaptive frequency hopping. In step 500, a number of Bluetooth applications that are present on the host device, for example, the PC 100, may be determined. The Bluetooth applications may be for devices such as a wireless mouse, a wireless keyboard, or interfacing to a PDA to synchronize address books and/or appointments.

In step 510, the bandwidth requirements of the Bluetooth enabled applications may be estimated. This may be accomplished to load balance the Bluetooth applications among the various Bluetooth communication devices, or to assign a bandwidth intensive application to its own piconet. For example, if a host device, for example, the PDA 120, has a Bluetooth application that downloads video files and other Bluetooth applications, for example, a cellular phone hands-free application, it may be desirable to separate the video download application and the cellular phone hands-free application to different Bluetooth communication devices. In this manner, the downloading of the video files may be accomplished without being affected by and/or affecting other applications that need to share the Bluetooth bandwidth.

In step 520, the various Bluetooth applications on the host device may be allocated to the plurality of Bluetooth communication devices. This may be accomplished by taking into account various factors such as, for example, bandwidth estimates of the various Bluetooth applications and number of the Bluetooth applications. An application that is expected to use more bandwidth than other applications may be assigned by itself to a Bluetooth communication device, or with other applications that may not be expected to use a lot of bandwidth. If the Bluetooth communication devices provide different available bandwidths, those Bluetooth applications that require, or are expected to require, more bandwidths than others may be allocated to the Bluetooth communication device that provides the higher bandwidth.

In step 530, sets of frequencies may be assigned to the plurality of Bluetooth communication devices. This may be necessary to keep the plurality of Bluetooth communication devices on the same host device from interfering with each other while they are transmitting. By assigning a specific set of frequencies for adaptive frequency hopping, the various Bluetooth communication devices may not interfere with each other during transmission. The sets of frequencies assigned to the various Bluetooth communication devices on a Bluetooth device may be determined by an algorithm that may be design and/or implementation dependent. For example, an algorithm for two Bluetooth communication devices in a host device may assign even frequencies to one Bluetooth communication device and odd frequencies to the other Bluetooth communication device. Another example may be an algorithm that assigns frequencies among the Bluetooth communication devices in a host device in an alternating manner. For example, if there are three Bluetooth communication devices in a device host, every third frequency may be assigned to each Bluetooth communication device. These exemplary schemes may be modified by taking in to account the frequencies that have known interferences. These frequencies may be removed from the list of frequencies that may be assigned, and the remaining frequencies may be assigned to the Bluetooth communication devices.

Figure 6:
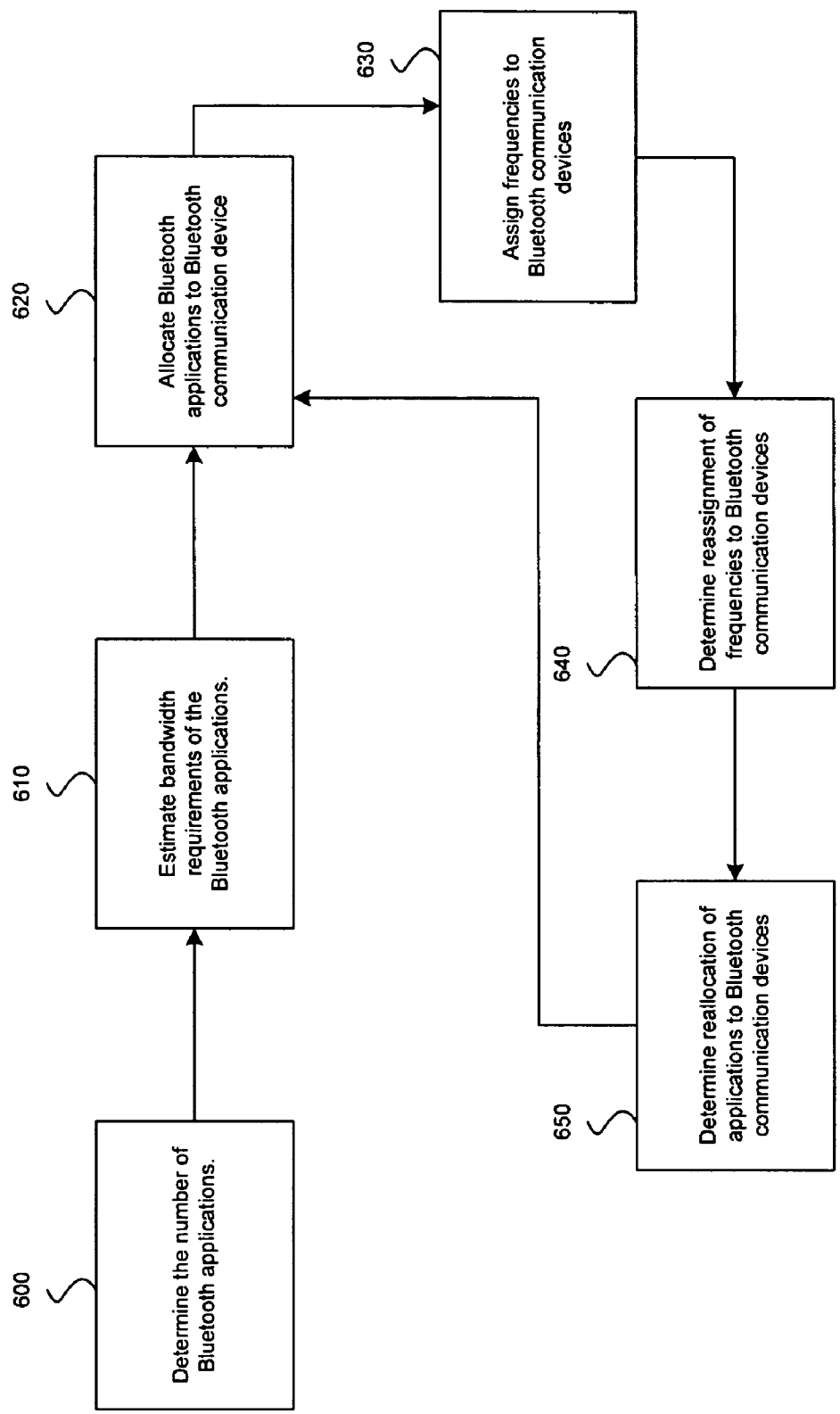
FIG. 6 is an exemplary flow diagram illustrating frequency separation for multiple Bluetooth communication devices on a single host device with frequency reassignment and application reallocation, in accordance with an embodiment of the invention.

FIG. 6 is an exemplary flow diagram illustrating frequency separation for multiple Bluetooth communication devices on a single host device with frequency reassignment and application reallocation, in accordance with an embodiment of the invention. Referring to FIG. 6, steps 600 to 630 may be similar to the steps 500 to 530 with respect to the FIG. 5. Step 600 comprises determining the number of Bluetooth enabled applications on a host device. Step 610 comprises estimating bandwidth requirements for the Bluetooth enabled applications on the host device. Step 620 comprises assigning Bluetooth enabled applications to Bluetooth communication devices. Step 630 comprises assigning frequencies to each Bluetooth communication device for adaptive frequency hopping. Step 640 comprises determining whether frequencies assigned to each Bluetooth communication device may need to be reassigned. Step 650 comprises determining whether Bluetooth applications need to be reallocated to each Bluetooth communication device.

Referring to FIGS. 1, 4a, and 6, the steps 600 to 650 may be utilized to assign frequencies to a plurality of Bluetooth communication devices, for example, the Bluetooth communication device_1 410 and the Bluetooth communication device_n 420, for use in adaptive frequency hopping. In step 600, a number of Bluetooth applications that are present on the host device, for example, the PC 100, may be determined. The Bluetooth applications may be for devices such as a wireless mouse, a wireless keyboard, or interfacing to a PDA to synchronize address books and/or appointments.

In step 610, the bandwidth requirements of the Bluetooth enabled applications may be estimated. This may be accomplished to load balance the Bluetooth applications among the various Bluetooth communication devices, or to assign a bandwidth intensive application to its own piconet. For example, if a host device, for example, the PDA 120, has a Bluetooth application that downloads video files and other Bluetooth applications, for example, a cellular phone hands-free application, it may be desirable to separate the video download application and the cellular phone hands-free application to different Bluetooth communication devices. In this manner, the downloading of the video files may be accomplished without being affected by other applications that need to share the Bluetooth bandwidth.

In step 620, the various Bluetooth applications on the host device may be allocated to the plurality of Bluetooth communication devices. This may be accomplished by taking into account various factors such as, for example, bandwidth estimates of the various Bluetooth applications, number of the Bluetooth applications, and bandwidths of the various Bluetooth communication devices. An application that is expected to use more bandwidth than other applications may be assigned by itself to a Bluetooth communication device, or with other applications that may not be expected to use a lot of bandwidth. If the Bluetooth communication devices provide different available bandwidths, those Bluetooth applications that require, or are expected to require, more bandwidth than others may be allocated to the Bluetooth communication device that provides the higher bandwidth.

In step 630, sets of frequencies may be assigned to the plurality of Bluetooth communication devices. This may be necessary to keep the plurality of Bluetooth communication devices on the same host device from interfering with each other while they are transmitting. By assigning a specific set of frequencies for adaptive frequency hopping, the various Bluetooth communication devices may not interfere with each other during transmission. The sets of frequencies assigned to the various Bluetooth communication devices on a Bluetooth device may be determined by an algorithm that may be design and/or implementation dependent. For example, an algorithm for two Bluetooth communication devices in a host device may assign even frequencies to one Bluetooth communication device and odd frequencies to the other Bluetooth communication device. Another example may be an algorithm that assigns frequencies among the Bluetooth communication devices in a host device in an alternating manner. For example, if there are three Bluetooth communication devices in a device host, every third frequency may be assigned to each Bluetooth communication device. These exemplary schemes may be modified by taking into account the frequencies that have known interferences. These frequencies may be removed from the list of frequencies that may be assigned, and the remaining frequencies may be assigned to the Bluetooth communication devices.

In step 640, the frequencies assigned to the Bluetooth communication devices, for example, the Bluetooth communication device_1 410 and the Bluetooth communication device_n 420, may be reassigned. The reassignment may be based, for example, on the Bluetooth frequencies that may interfere with frequencies used by other communication devices. The manner of reassigning frequencies may be similar to the manner of assigning frequencies described in step 630.

In step 650, the various Bluetooth applications on the host device may be reallocated to the plurality of Bluetooth communication devices. The step 650 may consider, for example, either the estimated or measured bandwidth required by the Bluetooth applications, and the number of Bluetooth applications in determining whether to reallocate the Bluetooth applications. The manner of reallocating applications may be similar to the manner of allocating Bluetooth applications described in step 620.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for assigning communication frequencies, the method comprising:

determining from a set of frequencies to be used, initial frequencies to be utilized by a plurality of Bluetooth communication devices residing on a single host device;

assigning a first portion of said determined initial frequencies to a first of said plurality of Bluetooth communication devices;

assigning at least a second portion of said determined initial frequencies selected from a remaining portion of said determined initial frequencies to at least a second of said plurality of Bluetooth devices residing on said single host device; and allocating Bluetooth applications to said plurality of Bluetooth communication devices based on one or both of: available bandwidth of each of said plurality of Bluetooth communication devices and/or an identifier of each of said Bluetooth applications.

2. The method according to claim 1, comprising reallocating said Bluetooth applications to said plurality of Bluetooth communication devices based on one or both of: available bandwidth of each of said plurality of Bluetooth communication devices and/or said identifier of each of said Bluetooth applications.

3. A machine-readable storage having stored thereon, a computer program having at least one code section for assigning communication frequencies, the at least one code section being executable by a machine for causing the machine to perform steps comprising:

determining initial frequencies to be utilized by a plurality of Bluetooth communication devices residing on a single host device;

assigning a first portion of said determined initial frequencies to a first of said plurality of Bluetooth communication devices;

assigning at least a second portion of said determined initial frequencies selected from a remaining portion of said determined initial frequencies to at least a second of said plurality of Bluetooth devices residing on said single host device; and allocating Bluetooth applications to said plurality of Bluetooth communication devices based on one or both of: available bandwidth of each of said plurality of Bluetooth communication devices and/or an identifier of each of said Bluetooth applications.

4. The machine-readable storage accordingly to claim 3, comprising code for reallocating said Bluetooth applications to said plurality of Bluetooth communication devices based on one or both of: available bandwidth of each of said plurality of Bluetooth communication devices and/or said identifier of each of said Bluetooth applications.

5. A system for assigning communication frequencies, the system comprising:

an application controller that determines initial frequencies to be utilized by a plurality of Bluetooth communication devices residing on a single host device;

said application controller assigns a first portion of said determined initial frequencies to a first of said plurality of Bluetooth communication devices;

said application controller assigns at least a second portion of said determined initial frequencies selected from a remaining portion of said determined initial frequencies to at least a second of said plurality of Bluetooth devices residing on said single host device; and said application controller allocates Bluetooth applications to said plurality of Bluetooth communication devices based on one or both of: available bandwidth of each of said plurality of Bluetooth communication devices and/or an identifier of each of said Bluetooth applications.

6. The system according to claim 5, wherein said application controller reallocates said Bluetooth applications to said plurality of Bluetooth communication devices based on one or both of: available bandwidth of each of said plurality of Bluetooth communication devices and/or said identifier of each of said Bluetooth applications.

* * * * *

UNITED STATES PATENT AND TRADEMARK OFFICE
CERTIFICATE OF CORRECTION

PATENT NO.        : 7,647,023 B2
APPLICATION NO.   : 11/149725
DATED             : January 12, 2010
INVENTOR(S)       : Asif Grushkevich It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1003 days.

Signed and Sealed this

Sixteenth Day of November, 2010

David J. Kappos
*Director of the United States Patent and Trademark Office*